Nov. 26, 1968     J. K. ALLEN     3,413,188
GLASS FIBER-WOOD LAMINATES AND METHODS OF
PRODUCING SUCH LAMINATES
Filed June 14, 1963     2 Sheets-Sheet 1

WITNESSES

INVENTOR
John K. Allen
BY
ATTORNEY

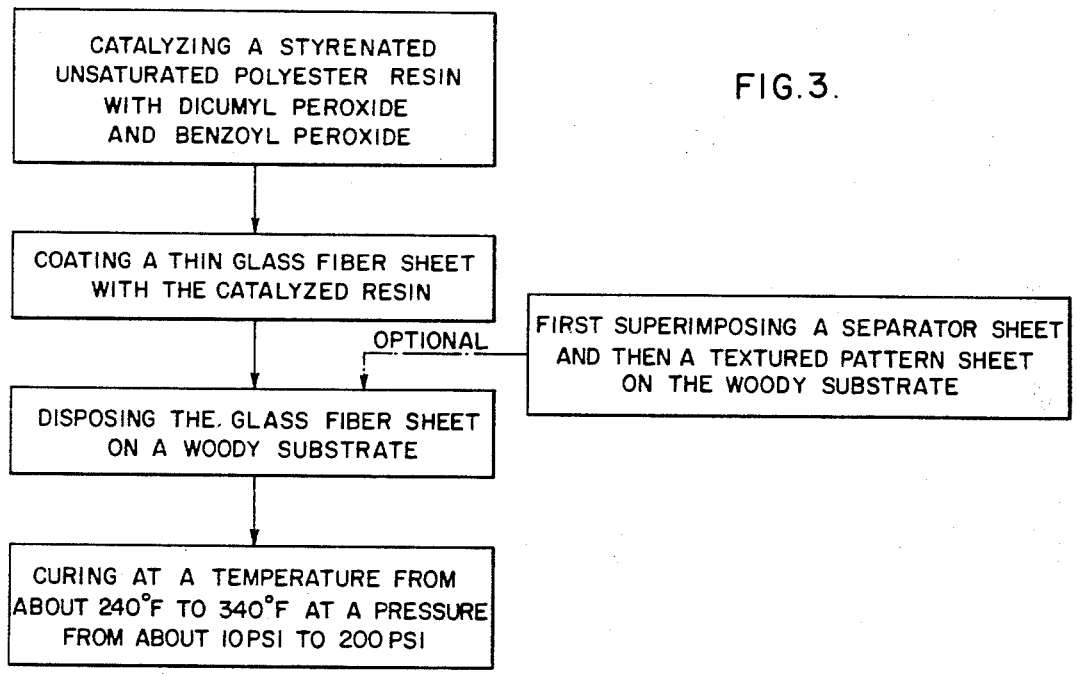

United States Patent Office 3,413,188
Patented Nov. 26, 1968

3,413,188
GLASS FIBER-WOOD LAMINATES AND METHODS OF PRODUCING SUCH LAMINATES
John K. Allen, Varnville, S.C., assignor to Westinghouse Electric Corporation, Pittsburgh, Pa., a corporation of Pennsylvania
Filed June 14, 1963, Ser. No. 287,886
11 Claims. (Cl. 161—195)

This invention relates generally to laminated plastics and methods for producing them. More specifically, the invention relates to laminated plastics having a polyester-fiber glass surface and to methods for producing such surfaces with an attractive appearance.

The use of fiber glass as a reinforcing medium in plastic or resinous binders has become widespread. Fiber glass has also been employed in combination with various core or base materials and resinous binders to form laminated plastics. An outstanding and particularly successful example is the application of fiber glass in the small boat industry.

Polyester resins have been extensively employed as binders in structures which embody fiber glass. As employed herein, the term polyester refers to a linear polyunsaturated polyester base resin dissolved in an unsaturated polymerizable monomer and to the copolymer produced by the reaction of the monomer and the unsaturated base resin. The polyester base resins are produced from the reaction of bifunctional organic acids and bases selected from a large group of dihydric alcohols (glycols) and dibasic or dicarboxylic acids. To produce an unsaturated polyester base resin for the purpose of this invention, at least a portion of the dibasic acid component must be an unsaturated acid.

The final cured product becomes a copolymer of the unsaturated polyester base resin and the monomer. Styrene is extensively employed as the unsaturated monomer in the resinous mixture. These resinous mixtures and other polyesters may be considerably extended with minneral fillers. With an added peroxide or hydroperoxide catalyst the resinous mixtures are very rapidly polymerized by heat to a solid, infusible state without loss of volatile matter or they may be more slowly cured at room temperatures with certain catalysts and promoters.

When polyester resins are employed to bond a fiber glass layer to a woody core or substrate at room temperature with known catalytic agents and promoters, problems in curing the polyesters are encountered with relatively thin layers of fiber glass. The cure of the polyester is materially inhibited by air, water, lignin and loss of the exothermic heat generated by the reaction. Highly promoted or catalyzed resin systems have an extremely short pot-life so that the extent of catalyzation is limited.

Composites which may be cured at ambient temperatures have been generally limited to a minimum fiber glass thickness of about 60 mils. Where any appreciable inhibition exists, cures are likely to be poor and when very thin layers, about 10 to 20 mils thick, are attempted, the loss of exothermic heat to the surrounding media may result in only a very little cure. It is important to obtain a relatively good cure in styrenated polyesters if reasonable strength is to be obtained from the fiber glass layer and if the resinous binder is to function as such for a reasonable length of time.

Employing elevated temperatures to cure the catalyzed polyesters is not a solution to the curing problems associated with thin layers of fiber glass on woody substrates. In very thin layers, the loss of exothermic heat to the mold may prevent cure at temperatures of 130° C. or less and yet at 140° C. blisters due to volatilizing monomers may be obtained. For example, when a benzoyl peroxide catalyzed polyester is cured in contact with plywood, a good cure and resulting good bond between the plywood and fiber glass layer is difficult or impossible to obtain because the rosin, lignin, water and other inhibitors negate the curing reaction. Efforts to improve the cure by increasing cure temperatures and the catalyst content actually reduce the amount of gross cross-linking, and result in the formation of many small low molecular weight groups, a form of poor cure. Moreover, raising the temperature of the cure will drive more inhibiting matter into the critical interface between the core and resin. Those skilled in the art will recognize that a small delaminated area, particularly in decorative laminates, is unsightly and undesirable.

Composite polyester-fiber glass woody core structures may be employed in applications such as shelving, telephone books, truck body paneling and the like where a decorative appearance of the fiber glass surface is important. To improve the appearance and weather resistance, a gel coat has been applied in a separate operation, to the surface of the fiber glass. This gel coat is ordinarily a coating of a polyester resin and must be cured in a separate operation.

Accordingly, it is the general object of this invention to provide a composite structure of a relatively thin layer of fiber glass bonded to a woody substrate with a catalyzed polyester resin.

Another object of this invention is to provide a method for producing a composite or laminate comprising a thin layer of fiber glass bonded to a woody substrate with a polyester resin catalyzed by certain curing agents.

Yet another object of this invention is to provide attractive surfaces on polyester fiber glass laminates without resorting to a separate operation.

Briefly, the present invention accomplishes the above cited objects by providing methods for catalyzing the polyester binders so that relatively thin layers of fiber glass may be satisfactorily bonded to woody substrates. Certain textured pattern sheets are employed in the molding operation to push the fiber glass mat down and permit a resin rich surface to form over the fiber glass to improve the appearance and weathering of the surface.

Further objects and advantages of the invention will become apparent as the following description proceeds and features of novelty which characterize the invention will be pointed out in particularity in the claims annexed to and forming a part of this specification.

For a better understanding of this invention, reference may be had to the accompanying drawing, in which:

FIG. 3 is a chart illustrating a method in accordance with the invention.

Figure 1:
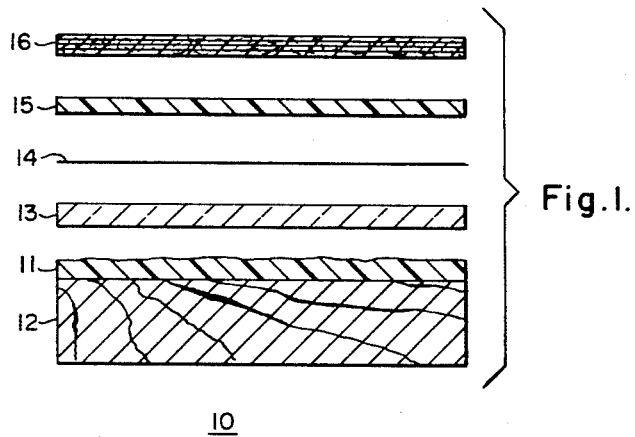
FIGURE 1 is a cross-sectional view of a build-up or lay-up employed to produce a laminate.

It has now been discovered that a polyester resin system containing certain curing agents will produce a good cure and bond between thin layers of fiber glass and woody substrates. As noted briefly hereinabove, the binder resins employed in this invention are unsaturated polyesters dissolved in a polymerizable monomer such as styrene. The polyesters are produced from the reaction of dihydric alcohols or glycols with dibasic acid components, at least a portion of the acid component being an unsaturated acid.

The ratio of monomer to polyester base resin will vary from about 15 parts of monomer to 85 parts of polyester base resin to about 65 parts of monomer to 35 parts of polyester base resin, by weight. Employing approximately equal molar amounts of alcohol and acid in the reaction to produce the polyester base resin, at least about 25%, by weight, of the acid component should be an unsaturated acid. It should be understood, of course, that an unsaturated acid or mixtures of unsaturated acids may comprise the entire acid component. Examples of satisfactory saturated acids include phthalic anhydride and isophthalic acid. Examples of satisfactory unsaturated acids include maleic anhydride and fumaric acid. Although many glycols may be employed, ethylene glycol is preferred. Although many monomers may be employed, styrene is preferred. It should be understood that the foregoing materials are exemplary and that mixtures thereof and other diabasic acids and glycols may be employed to produce the polyester base resins in accordance with techniques known in the art. Reference may, for example, be had to "Polyester Resins" by John R. Lawrence, Reinhold Publishing Corporation, 1960, for specific details.

While many catalysts and promoters for the reaction of the monomer and polyester base resin are known in the art, only the combination of dicumyl peroxide with benzoyl peroxide or, in some instances the dicumyl peroxide alone, are suitable in accordance with this invention to produce a fiber glass layer less than about 40 mils thick bound to a woody substrate with the polyester binder. At least about 0.25 part of the dicumyl peroxide alone or the combination of dicumyl peroxide and benzoyl peroxide per 100 parts of polyester binder (the mixture of the monomer and the polyester base resin) are required to produce a satisfactory cure. Curing temperatures from about 120 to 130° C. are preferred.

The fiber glass reinforcing layer is employed to produce composite or laminated structures with superior flexural, tensile and impact strengths. The basic fibers may be in forms such as mats, rovings, yarns or woven goods, the latter being preferred. A specific range of resin to glass ratios must be employed and may vary on a weight basis of from one part of fiber glass to six parts of resin to equal parts of fiber glass and resin. It will be undrstood, of course, that the term resin as employed herein, refers to the admixture of monomer and polyester as applied.

The woody substrate of this invention may be any one of a number of commonly employed woody core structures, as for example, plywood, chipboard, hardboard and the like. The fiber glass may be bonded to one or both sides of the core or substrate.

In accordance with another aspect of this invention, it has been discovered that a textured attractive surface may be on fiber glass bonded to a substrate in a single operation. The attractive surface heretofore associated only with laminates which have an expensive separately applied resinous gel-coat may now be produced in the laminating or molding operation. The heretofore described resin to glass ratios may be maintained in making up the composite.

Certain pattern sheets are employed in the make up inserted into the mold which push the glass layer down and permit a resin rich surface to form over the glass. This resin rich surface, when cured, has the appearance and weather resistance of the more expensive and separately applied gel-coat. Moreover, the patterning effect causes the glass fibers to be hidden so well that panels are not easily identified visually as containing fiber glass. Glass mats, flexible polyurethane foams with about 10 to 20 pores per lineal inch, expanded packing crate paper, creped papers and expanded or perforated metals have been found to be satisfactory materials for the pattern sheet. It will be apparent that all of these materials have a textured surface so that a uniformly flat surface is not in contact with the surface of the laminate in the molding operation.

Table I, hereinbelow, outlines five resin systems. Each of the systems employed a polyester-styrene admixture. The polyester was a general purpose type based upon isophthalic acid and malic anhydride or fumaric acid.

Formula A shows a room temperature promoted system. With this percentage of cobalt naphthenate as an accelerator and methyl-ethyl ketone peroxide catalyst, a working life of only 20 minutes is available. This system would not cure in 96 hours when applied on a fiber glass mat to make a 20 mil layer against plywood and hardboard even though the ambient temperatures were at times above 90° F.

Formula B employs benzoyl peroxide as the catalyst and was cured at elevated temperatures. On plywood, it was noted that in cases where the plywood had much moisture, cures were retarded and where rosin would bleed from internal knots, uncured spots resulted. A cure of any consequence was unobtainable against hardboard. Increasing the amount of catalyst did not eliminate the problems. Formula C is similar to Formula B except that a second catalyst, dicumyl peroxide was employed in combination with the benzoyl peroxide. With this combination, very rapid, good cures are obtained on plywood, hardboard, chipboard and the like. With this system, a curing temperature above 240° F. is essential since dicumyl peroxide decomposes very slowly at lower temperatures.

Formula D is the same as Formula C except that the benzoyl peroxide has been omitted and the dicumyl peroxide content has been increased. Good cures are obtained with this system except where inhibiting agents were present in a very great degree. This latter circumstance is encountered where certain inhibiting pigments or fillers may be used.

Formula E is a duplicate of Formula C except that the polyester base resin employed a combination of phthalic anhydride and maleic anhydride as the acid component. The cure obtained with this formula compared favorably with the cure obtained with the system of Formula C.

TABLE I

| Material | Resin formulas, weight basis | | | | |
| --- | --- | --- | --- | --- | --- |
| | A | B | C | D | E |
| Polyester base resin | 100 | 100 | 100 | 100 | 100 |
| Styrene | 5-30 | 5-30 | 5-30 | 5-30 | 5-30 |
| Calcium carbonate filler | 100 | 100 | 100 | 100 | 100 |
| Titanium dioxide pigment | 8 | 8 | 8 | 8 | 8 |
| Cobalt naphthenate | 0.25 | | | | |
| Methyl-ethyl ketone peroxide | 1.5 | | | | |
| Benzoyl peroxide | | 1-2 | 1 | | 1 |
| Dicumyl peroxide | | | 1 | 2 | 1 |

It should be understood that in both aspects of this invention, the polyester resin may be extended by the addition of finely divided inert mineral fillers such as calcium carbonate, quartz or calcium aluminum silicate in amounts up to a maximum of 2 parts of filler to 1 part of polyester resin (including the monomer) and preferably up to about equal parts of filler and polyester resin. Of course the polyester resin may be employed with no addition of mineral filler.

In molding the composites, pressures as low as 10 p.s.i. and up to 1000 p.s.i. may be employed but a maximum pressure of about 200 p.s.i. is preferred if the thickness of the woody substrate is to be maintained. Platen temperatures from about 240 to 340° F. are employed. It should be recognized that the actual curing temperature will be in this range since the curing reaction is exothermic and there is a loss of this exothermic heat.

Referring now to FIGURE 1, there is illustrated a composite make-up 10 for insertion into the mold. The resin 11 described in Formula C in Table I, has been applied to the plywood core or substrate 12. A glass mat layer 13 having a weight of one ounce per square foot is disposed over the resin. The resin to glass ratio is 1:1 on a weight basis. A cellophane separator 14 is placed over the fiber glass layer and a pattern sheet of polyurethane foam having from 10 to 20 pores per lineal inch is placed over the cellophane. A molding pad of paper is placed thereover to protect the pattern sheet and also serve as an aid to uniform pressure in temperature distribution.

One or more of these composite make-ups is placed between caul plates and inserted into a molding press, molded at 50 to 70 p.s.i., the platens of the press being maintained at about 290 to 315° F. so that a resin curing temperature above about 240° F. is maintained and cured for two to five minutes. The composite is pulled from the mold while hot.

Figure 2:
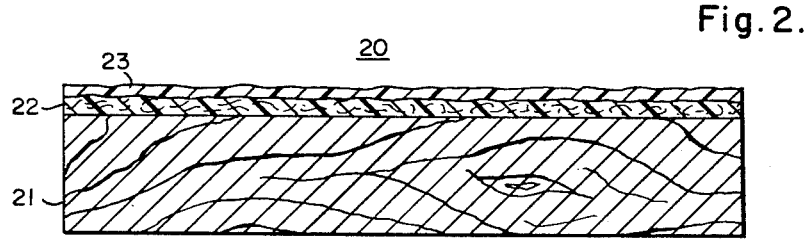
FIG. 2 is a cross-sectional view of a finished laminate.

The composite or laminate produced is illustrated in detail in FIGURE 2. Referring now to FIGURE 2, there is illustrated a composite or laminate 20 comprised of a plywood core 21, a fiber glass layer 22 bonded to the core by a polyester resin and a resin rich surface 23 disposed over the fiber glass layer.

It should be understood that the fiber glass mat itself may be preimpregnated and placed into the make-up for insertion into the mold in a wet or dry condition. The described resin to glass ratios must, of course, be maintained.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. A method of producing laminated structures of fiber glass having a thickness less than about 40 mils and woody substrates comprising the steps of catalyzing a styrenated-unsaturated polyester resin wherein the polyester is derived from the reaction of a dihydric alcohol and a dibasic acid, at least about 25%, by weight, of said dibasic acid being unsaturated and the ratio of styrene to polyester being in the range of from 15:85 to 65:35 parts by weight, with at least about 0.25 part of a catalyst combination comprising dicumyl peroxide and benzoyl peroxide per 100 parts of resin, disposing the fiber glass and woody substrate with at least a portion of the polyester resin therebetween and curing the polyester at a temperature from about 240° F. to 340° F. at a pressure from about 10 p.s.i. to 200 p.s.i.

2. The method of claim 1 in which the fiber glass is a mat having a thickness from about 5 to 40 mils.

3. In the method of bonding fiber glass layers less than 40 mils in thickness to woody substrates with styrenated-unsaturated polyester binders wherein the polyester is derived from the reaction of a dihydric alcohol and a dibasic acid, at least about 25%, by weight, of said dibasic acid being unsaturated and the ratio of styrene to polyester being in the range of 15:85 to 65:35 parts by weight, the improvement comprising catalyzing the polyester binders with a combination of benzoyl peroxide and dicumyl peroxide catalyst system, said catalyst system being present in an amount of at least 0.25 part per 100 parts of polyester binder and curing said catalyzed binder at a temperature from about 240° F. to 340° F.

4. A method of producing a composite of a fiber glass layer bonded by a styrenated-unsaturated polyester resin wherein the polyester is derived from the reaction of a dihydric alcohol and a dibasic acid, at least about 25%, by weight, of said dibasic acid being unsaturated and the ratio of styrene to polyester being in the range of from 15:85 to 65:35 parts by weight to a woody substrate comprising the steps of superimposing a separator sheet and a textured pattern sheet over a resin impregnated fiber glass layer disposed on the woody substrate with said separator sheet positioned between said pattern sheet and said fiber glass layer, the resin impregnated fiber glass layer having a fiber glass resin ratio in the range of 1:6 to 1:1 on a weight basis and curing the polyester at a pressure of about 10 to 200 p.s.i. at a temperature of about 240 to 340° F., said pattern sheet pushing the glass layer down and permitting a resin rich surface to form over the glass.

5. The method of claim 4 in which the pattern sheet is a glass mat.

6. The method of claim 4 in which the pattern sheet is a polyurethane foam having from about 10 to 20 pores per lineal inch.

7. The method of claim 4 in which the pattern sheet is an expanded packing crate paper.

8. The method of claim 4 in which the pattern sheet is a creped paper.

9. The method of claim 4 in which the pattern sheet is a perforated metal.

10. A laminated structure comprising a layer of fiber glass from about 5 to 40 mils thick bonded to a woody substrate by a cured styrenated-unsaturated polyester resin wherein the polyester is derived from the reaction of a dihydric alcohol and a dibasic acid, at least about 25%, by weight, of said dibasic acid being unsaturated and the ratio of styrene to polyester being in the range of from 15:85 to 65:35 by weight, catalyzed with at least about 0.25 part by weight of a mixture of dicumyl peroxide and benzoyl peroxide per 100 parts of polyester resin.

11. A laminated structure comprising a layer of fiber glass having a thickness less than about 40 mils bonded to a woody substrate by a cured styrenated-unsaturated polyester resin wherein the polyester is derived from the reaction of a dihydric alcohol and a dibasic acid, at least about 25%, by weight, of said dibasic acid being unsaturated and the ratio of styrene to polyester being in the range of from 15:85 to 65:35 parts by weight, catalyzed with at least about 0.25 part of a mixture of dicumyl peroxide and benzoyl peroxide per 100 parts of resin and having a fiber glass to resin ratio in the range of 1:6 to 1:1 on a weight basis and a textured layer consisting essentially of cured polyester resin overlying the fiber glass.

References Cited

UNITED STATES PATENTS

| | | | |
|---|---|---|---|
| 2,431,720 | 12/1947 | Willey | 264—297 |
| 2,606,855 | 8/1952 | Jenkins | 156—219 |
| 2,660,548 | 11/1953 | Soehner | 156—219 |
| 3,026,228 | 3/1962 | Robinson et al. | 161—195 XR |
| 3,080,267 | 3/1963 | Schmalz | 161—161 |
| 2,428,325 | 9/1947 | Collins | 161—143 |
| 2,570,958 | 10/1951 | Lee | 217—3 |
| 2,632,744 | 3/1953 | Howald | 161—232 X |
| 2,640,799 | 6/1953 | Grangaard | 161—232 X |
| 3,225,013 | 12/1965 | Fram | 161——214 X |
| 2,491,409 | 11/1946 | Kropa et al. | 260—45.4 |
| 2,631,960 | 3/1953 | Dafter | 260—861 |
| 2,861,910 | 11/1958 | Johnston et al. | 156—332 |
| 2,962,052 | 11/1960 | Sergovic | 138—145 |

FOREIGN PATENTS 964,580  10/1950  France.

OTHER REFERENCES

Harrison, James B. et al., The Society of Plastics Industry, "Polyester Polymerization with Mixed Catalysts," February 1960, section 14–E, pp. 1–14.

EARL M. BERGERT, *Primary Examiner.*

W. E. HOAG, *Assistant Examiner.*